Patented May 20, 1952

2,597,085

UNITED STATES PATENT OFFICE 2,597,085

EMPLOYMENT OF NONAQUEOUS WELL DRILLING FLUIDS

Delmar H. Larsen, West Hollywood, Calif., assignor to National Lead Company, Los Angeles, Calif., a corporation of New Jersey No Drawing. Application April 17, 1944, Serial No. 531,494

4 Claims. (Cl. 252—8.5)

This invention relates to the art of drilling fluids used in the rotary method of drilling earth wells, as for oil and gas, and in particular relates to improvements in such drilling fluids made with an oil base instead of a water base.

The general features of rotary drilling are well-known and will be referred to only briefly here. A drilling fluid is circulated down through a drill pipe at the bottom of which is a bit provided with exits for the fluid, which latter then rises in the annular space between the drill pipe and the walls of the borehole to the surface, where after being freed of detritus it is circulated down the drill pipe. The circulation takes place continuously while the drill pipe is simultaneously rotated. The ordinary drilling fluid consists essentially of a suspension of clay in water, in some cases together with other additive agents such as weighting materials, emulsoid colloids such as bentonite or organic colloids, mud thinners and other materials. Such fluids have some disadvantages, the chief of which is that it is often considered undesirable to drill into an oil bearing zone with an aqueous fluid. Also, aqueous fluids, unless carefully prepared and controlled, tend to allow shaly formations penetrated to swell, thus endangering the success of the drilling operation.

In order to avoid the use of an aqueous drilling fluid many alternatives have been suggested and used; thus the practice has arisen of using oil instead of water as the drilling mud fluid base. The oils used are generally hydrocarbon oils and may range from crude oils to fairly light distillates. Drilling with plain oil is scarcely more satisfactory than drilling with plain water, so that in recent years a number of so-called "oil base drilling fluids" have been developed in which the desirable physical properties of the water base fluids such as high density, plasticity, thixotropy and infiltrability have been sought to be attained by the use of additive agents particularly suited to the oleaginous environment. An oily base, such as a light fuel oil derived from crude oil by distillation, has been compounded with materials which disperse in the oil with a tendency to form gels rather than sols, and thus impart both infiltrability and plasticity. Examples of the latter are calcium and magnesium hydroxides and oxides, lampblack, blown asphalt, alkali metal and heavy metal salts of organic acids of relatively high molecular weight such as oleates, stearates, naphthenates and the like, and similar materials. Such a mud fluid if used by itself will generally be too low in specific gravity; accordingly, a weighting material such as barytes, pyrite, galena, limestone, oyster shells, spent refinery clay, and the like have been added. These weighting materials are held in suspension by the gel properties imparted by the materials previously referred to, although it is highly advantageous to have the weighting material of not too strongly hydrophilic character.

One of the most important single characteristics of a drilling fluid is its infiltrability, by which is meant its ability to resist filtration. In the ordinary process of rotary drilling, an excess hydrostatic pressure exists between the fluid in the hole and the porous formations penetrated. The result is that the fluid phase of the drilling fluid escapes into the porous formation, leaving behind all of the solids in the fluid, including most or all of the colloids. This behavior is almost equally deleterious both in the case of the water base and the coil base fluid, because if allowed to occur unchecked the resulting filter cake which builds up on the walls of the hole can attain such proportions that it will pack off and stick to the drill pipe and bit when an attempt is made to withdraw these from the hole. Moreover, the fluid escaping into the formation can, for example, swell shales if containing water, and disintegrate them if containing oil. Thus, in both types of drilling fluids it is extremely desirable, and in the case of drilling in certain difficult areas it is absolutely necessary, to provide a fluid of which the filter cake is so highly impermeable that continuned filtration is more or less completely inhibited. In the ordinary type of oil base mud fluid this is achieved with some measure of success, but unfortunately the materials which successfully yield infiltrability to an oil base drilling fluid also impart gelling properties to the fluid, so that even under favorable circumstances it is seldom possible to achieve as low a fluid loss as would be desirable or even necessary, because excessive plasticity results when an attempt is made to add sufficient of the agent to increase the infiltrability.

One of the objects of the invention is to provide a means for increasing the infiltrability of an oil base drilling fluid while at the same time not increasing its plasticity appreciably. Another object of the invention is to provide a novel means for increasing the infiltrability of an oil base drilling mud.

Other objects will appear as the description of the invention proceeds; it will, however, be understood that this invention is susceptible of various embodiments, within the scope of the appended claims.

In accordance with an illustrative embodiment of this invention, a natural solid asphaltic mineral of the type and character dispersible in oil and chosen from the group consisting of gilsonite, manjak, glance pitch, and grahamite, is incorporated with an oil base to form a drilling fluid. Materials of this class form a unique division in the group of naturally occurring hydrocarbon minerals. As regards their behavior in an oil base drilling fluid, they can be distinguished sharply from natural asphalts, such as that occurring in the asphalt lake in Trinidad, by their property of reducing filtration to substantially zero. Natural asphalts such as the Trinidad asphalt give a substantial filter loss which would defeat the purposes of the present invention. Materials of the class with which this invention is concerned may be distinguished on the other hand from refined asphalts such as either steam refined or air-blown, in that in the case of the steam refined asphalts the filtration is again high as in the case of the natural Trinidad asphalt; likewise in that, in the case of the air-blown asphalts, while the latter yield good infiltrability they also yield considerable gel strength or plasticity to the fluid, which as has been noted above limits their use. Suspending agents and/or weighting materials of the character described and dispersible in oil may also be added.

The following table gives examples of typical oil base drilling fluids, showing not only those which can be made up in accordance with this invention, but also, for comparison, fluids made up with natural asphalt and air-blown asphalt. In these examples 4% of slaked lime is used to give suspending properties, and approximately 33% of finely ground calcium carbonate derived from oyster shells is used to give body to the mud and increase its density. The 60-minute fluid loss was determined by the standard method of the American Petroleum Institute at room temperatures and 100 lbs. per sq. in., while the gel strengths were determined with a Stormer viscosimeter, again using the standard method of the American Petroleum Institute.

work about equally well. The hydrocarbon minerals of this invention being solids can either be dissolved for use in a light hydrocarbon oil such as the oil to be used as the base of the fluid, or may be finely ground particularly when ground with other of the solid materials of the mix, whereupon good dispersion can be readily obtained in the oil to be used.

The addition of the materials of this invention serves the primary purpose of increasing the infiltrability of the fluids to which they are added, so much so, as seen from the table above, that no filtration can be detected in a filtration test of one hour's duration. It will be evident that should other properties be desired in the fluid, other ingredients may be added to secure them. For example, if high gel strengths particularly at higher temperatures are desired, various of the plasticizing ingredients named hereinbefore and dispersible in oil can be added, as is well known to the art. Weighting materials, such as heretofore enumerated and which are dispersible in oil, can also be added to give any desired weight. Suspending or dispersing agents, such as heretofore enumerated and which are dispersible in oil can also be added. Most of the materials of this invention will tend to increase the viscosity of the fluid at room temperature, although this effect disappears at even moderately elevated temperatures the gel strength imparted by these materials is nil, or in any case wholly negligible. The natural asphalt may be compounded with the suspending agent, or with the weighting material, or with both, to provide a prepared material designed for addition to the drilling fluid, or to the non-aqueous vehicle, such as a mineral oil.

Having thus described the invention what is claimed is:

1. An oil-base well-drilling fluid containing a natural asphalt of a type and character dispersible in oil and chosen from the group consisting of gilsonite, manjak, glance pitch and grahamite, in an amount sufficient to substantially reduce the filtration loss.

| Composition of Fluid: | | | | | | | | | | | | |
|---|---|---|---|---|---|---|---|---|---|---|---|---|
| Slaked lime | 4 | 4 | 4 | 4 | 4 | 4 | 4 | 4 | 4 | 4 | 5 | 4 |
| Stove oil | 50 | 50 | 50 | 50 | 50 | 50 | 50 | 50 | 50 | 50 | 50 | 50 |
| Ground oyster shells | 33 | 33 | 33 | 33 | 33 | 33 | 33 | 33 | 33 | 33 | 31 | 33 |
| Gilsonite, M. P. 300°–340° F | 13 | | | | | | | | | | | |
| Gilsonite, M. P. 300°–325° F | | 13 | | | | | | | | | | |
| Gilsonite, M. P. 370° F | | | 13 | | | | | | | | | |
| Gilsonite, M. P. 380° F | | | | 13 | | | | | | | | |
| Gilsonite, M. P. 333° F | | | | | 13 | | | | | | | |
| Manjak (glance pitch) | | | | | | 13 | | | | | | |
| Grahamite | | | | | | | 13 | | | | | |
| Trinidad Lake Asphalt | | | | | | | | 13 | | | | |
| Steam refined asphalt M. P. 165° F. Pen. 6–7 | | | | | | | | | 13 | | | |
| Steam refined asphalt, M. P. 165° F. Pen. 6–7 | | | | | | | | | | 13 | | |
| Air-blown asphalt M. P. 232°, Pen. 16 | | | | | | | | | | | 14 | |
| Air-blown asphalt M. P. 270°, Pen. 10 | | | | | | | | | | | | 13 |
| Properties of Fluid: | | | | | | | | | | | | |
| Filtration Loss cc. in 60 min. test | Nil | Nil | Nil | Nil | Nil | Nil | Nil | 3.6 | 25 | 75 | Nil | Nil |
| Gel Strength at room temperature | Nil | Nil | Slight | Slight | Nil | Nil | Nil | Nil | Nil | Slight | High | Very High |
| Gel Strength at 200° F | Nil | Nil | Nil | Nil | Nil | Nil | Nil | Nil | Nil | Nil | Med. High | High |

The materials forming the subject of this invention are readily obtainable, particularly in the United States, and are commercially available at a reasonable cost. Many different grades of these materials are available particularly in the case of gilsonite; however, it has been found that the ordinary commercial grades appear to 2. An oil-base well-drilling fluid comprising, a mineral oil vehicle and a natural asphalt of a type and character dispersible in oil and chosen from the group consisting of gilsonite, manjak, glance pitch, and grahamite, in an amount sufficient to substantially reduce the filtration loss.

3. An oil-base well-drilling fluid containing a natural asphalt of a type and character dispersible in oil and chosen from the group consisting of gilsonite, manjak, glance pitch and grahamite, in an amount sufficient to substantially reduce the filtration loss, and a suspending agent of the character described dispersible in oil.

4. An oil-base well-drilling fluid containing a natural asphalt of a type and character dispersible in oil and chosen from the group consisting of gilsonite, manjak, glance pitch and grahamite, in an amount sufficient to substantially reduce the filtration loss, and a weighting material of the character described dispersible in oil.

DELMAR H. LARSEN.

REFERENCES CITED

The following references are of record in the file of this patent:

UNITED STATES PATENTS

| Number | Name | Date |
| --- | --- | --- |
| 1,685,304 | West | Sept. 25, 1928 |
| 1,812,730 | West | June 30, 1931 |
| 2,043,504 | Blow | June 9, 1936 |
| 2,214,904 | Johnson | Sept. 17, 1940 |
| 2,223,027 | Dawson et al. | Nov. 26, 1940 |
| 2,241,255 | Garrison | May 6, 1941 |
| 2,316,967 | Miller | Apr. 20, 1943 |
| 2,316,968 | Miller | Apr. 20, 1943 |
| 2,356,776 | Miller | Aug. 29, 1944 |